United States Patent
Hatami Aghdam (10) Patent No.: US 10,274,094 B2
(45) Date of Patent: Apr. 30, 2019

(54) CHECK VALVE WITH IMPROVED RESPONSE TIME

(71) Applicant: Westport Power Inc., Vancouver (CA)

(72) Inventor: Kamal Hatami Aghdam, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 144 days.

(21) Appl. No.: 14/777,426

(22) PCT Filed: Mar. 11, 2014

(86) PCT No.: PCT/CA2014/050215
§ 371 (c)(1),
(2) Date: Sep. 15, 2015

(87) PCT Pub. No.: WO2014/138973
PCT Pub. Date: Sep. 18, 2014

(65) Prior Publication Data
US 2016/0032920 A1    Feb. 4, 2016

(30) Foreign Application Priority Data

Mar. 15, 2013 (CA) .................................... 2809504

(51) Int. Cl.
*F16K 15/02* (2006.01)
*F04B 39/10* (2006.01)
(Continued)

(52) U.S. Cl.
CPC ............ *F16K 15/023* (2013.01); *F04B 15/06* (2013.01); *F04B 39/102* (2013.01);
(Continued)

(58) Field of Classification Search
CPC .. F04B 53/102; F04B 53/103; F04B 53/1035; F04B 39/102; F04B 39/1026;
(Continued)

(56) References Cited

U.S. PATENT DOCUMENTS 307,172 A * 10/1884 Broadbent .............. F16K 15/06
137/533
3,084,707 A * 4/1963 Frye ........................ F15B 13/04
137/102

(Continued)

FOREIGN PATENT DOCUMENTS

AT      508 964 A1    5/2011
DE    1 500 010 A1   11/1969
(Continued)

OTHER PUBLICATIONS

Extended European Search Report with English Translation dated Dec. 27, 2016, for corresponding Chinese Application No. 2014/800142763, 4 pages.

(Continued)

*Primary Examiner* — Peter J Bertheaud
(74) *Attorney, Agent, or Firm* — Seed IP Law Group LLP (57) ABSTRACT

A check valve with improved response time comprises a valve member which has a central portion of a substantially convex shape and a guide portion that surrounds the central portion. The central portion has a central convex curvature extending towards the outlet port of the check valve, in the direction of the fluid flow. The guide portion has a weight to area ratio that is smaller than the weight to area ratio of the central portion. Such a check valve has an overall reduced weight of the valve member allowing a faster response time when the valve switches between its closed and open positions.

22 Claims, 8 Drawing Sheets

(51) Int. Cl.
*F04B 53/10* (2006.01)
*F04B 15/06* (2006.01)
*F16K 27/02* (2006.01)
*F04B 53/16* (2006.01)
*F04B 15/08* (2006.01)

(52) U.S. Cl.
CPC ...... *F04B 39/1026* (2013.01); *F04B 39/1033* (2013.01); *F04B 53/10* (2013.01); *F04B 53/102* (2013.01); *F04B 53/1035* (2013.01); *F04B 53/16* (2013.01); *F16K 15/021* (2013.01); *F16K 15/028* (2013.01); *F16K 27/0209* (2013.01); *F04B 2015/081* (2013.01); *Y10T 137/7895* (2015.04); *Y10T 137/7909* (2015.04)

(58) Field of Classification Search
CPC ........... F04B 39/1033; Y10T 137/7895; Y10T 137/7896; Y10T 137/7908; Y10T 137/7909; Y10T 137/7879; Y10T 13/7909; Y10T 13/7904; F16K 15/02; F16K 15/023; F16K 15/141; F16K 15/142; F16K 15/144; F16K 15/145; F16K 15/021; A61M 39/24; A61M 2039/242; A61M 2039/246; A61M 2039/2433; A61M 2039/2473; A61M 2039/2486
USPC .......................................... 417/569; 137/533
See application file for complete search history.

(56) References Cited

U.S. PATENT DOCUMENTS

| | | | | |
|---|---|---|---|---|
| 3,245,669 A | * | 4/1966 | Huggins | F16K 15/02 137/533 |
| 3,457,948 A | * | 7/1969 | Niedermayer | F04B 39/1026 137/512.1 |
| 3,926,216 A | | 12/1975 | Rülcker | |
| 3,942,916 A | * | 3/1976 | de Leeuw | F04B 53/1062 137/843 |
| 4,141,379 A | | 2/1979 | Manske | |
| 4,182,355 A | * | 1/1980 | Briel | F16K 15/144 137/496 |
| 4,188,978 A | * | 2/1980 | De Lorenzo | F16K 15/144 137/859 |
| 4,196,753 A | * | 4/1980 | Hammarstedt | G05D 7/0113 138/43 |
| 4,712,583 A | * | 12/1987 | Pelmulder | A61M 39/24 137/494 |
| 4,911,196 A | | 3/1990 | Kemp | |
| 5,727,594 A | * | 3/1998 | Choksi | A61M 39/24 137/537 |
| 6,089,272 A | | 7/2000 | Brand et al. | |
| 6,390,130 B1 | * | 5/2002 | Guala | A61M 39/24 137/859 |
| 6,823,893 B2 | * | 11/2004 | Hebmuller | F16K 15/023 137/533.17 |
| 7,484,526 B2 | * | 2/2009 | Zelson | F16K 15/144 137/515.7 |
| 7,673,653 B2 | * | 3/2010 | Mijers | F16K 15/144 137/843 |
| 8,251,099 B2 | * | 8/2012 | Carmody | A61M 39/24 137/852 |
| 8,291,936 B2 | * | 10/2012 | Carmody | A61M 39/24 137/512.1 |
| 8,328,543 B2 | | 12/2012 | Wilson | |
| 2004/0089349 A1 | | 5/2004 | Meyer | |
| 2004/0250864 A1 | | 12/2004 | Zelson | |
| 2007/0044846 A1 | | 3/2007 | Ashurst et al. | |
| 2011/0108147 A1 | | 5/2011 | Carmody et al. | |
| 2013/0025724 A1 | | 1/2013 | Grebinoski et al. | |
| 2013/0251565 A1 | | 9/2013 | Russell et al. | |

FOREIGN PATENT DOCUMENTS

| | | |
|---|---|---|
| DE | 198 23 310 A1 | 12/1999 |
| DE | 20 2007 012 680 U1 | 2/2008 |
| DE | 10 2009 033 365 A1 | 1/2011 |
| DE | 10 2009 046 119 A1 | 5/2011 |
| DE | 10 2010 060 337 A1 | 5/2011 |
| EP | 0 247 824 A2 | 12/1987 |
| EP | 0 247 824 A3 | 12/1987 |
| GB | 2 361 290 A | 10/2001 |
| GB | 2 361 290 B | 8/2004 |
| WO | 2006/052110 A1 | 5/2006 |

OTHER PUBLICATIONS

State Intellectual Property Office Action with English Translation dated Jan. 5, 2017, for corresponding Chinese Application No. 2014/800142763, 9 pages.
Chinese Office Action, dated Jul. 14, 2017, for Chinese Application No. 201480014276.3, 10 pages (with English Translation).
Chinese Search Report, dated Jul. 6, 2017, for Chinese Application No. 201480014276.3, 4 pages (with English Translation).
International Search Report dated Jun. 10, 2014, for corresponding International Application No. PCT/CA2014/050215, 3 pages.
Supplementary European Search Report, dated Sep. 19, 2016, for European Application No. EP 14 76 5694, 2 pages.
Communication pursuant to Article 94(3) EPC, dated Nov. 29, 2017, for European Application No. 14 765 694.6-1616, 5 pages.
Chinese Third Office Action, dated Jan. 19, 2018, for Chinese Application No. 201480014276.3, 10 pages. (with English Machine Translation).
Chinese Search Report, dated Jan. 10, 2018, for Chinese Application No. 201480014276.3, 4 pages. (with English Machine Translation).
European Office Action, dated Aug. 21, 2018, for European Application No. 14 765 694.6-1004, 7 pages.

* cited by examiner

CHECK VALVE WITH IMPROVED RESPONSE TIME

TECHNICAL FIELD

The present disclosure relates to a check valve with improved response time, more specifically to an intake check valve mounted in a pump for handling fluids in a liquid state near their boiling points.

BACKGROUND OF THE INVENTION

Check valves are valves that allow fluid flow through a hydraulic passage only one direction. Check valves generally have an inlet port for allowing fluid flow in and an outlet port for allowing fluid to exit the valve. Check valves of the type disclosed herein work automatically and are controlled mainly by the pressure of fluid flow. They are available in a variety of sizes and are used in a wide variety of applications.

One such application is, for example, an intake check valve installed in a reciprocating pump which allows fluid flow into the pump's working chamber which is typically a piston cylinder. Such intake check valves allow fluid to flow into the working chamber, during the intake stroke, but prevent fluid from flowing out of the pump in the opposite direction, during the pump's power stroke. An example of such a pump is a reciprocating piston pump used to supply liquid natural gas (LNG) to a natural gas fuelled internal combustion engine.

Because check valves are actuated mainly by the fluid forces acting on the valve member, the constructional features of the check valve have to be designed such that the valve allows the pump to operate with a low net positive suction head (NPSH). In addition, in a pump, the quickness with which an intake check valve responds to open and close fluid flow, at the desired times, has an impact on the volumetric efficiency of the pump.

An intake check valve that uses a valve member in the shape of a flat disc, which allows fluid flow between the intake valve inlet and outlet when the valve member is lifted from its seat is known. The response time of the valve depends largely on the fluid force acting on it and the weight of the valve member when no actuation assisting components, such as elastic elements, are employed to help with opening of the check valve.

In larger check valves, for example in high capacity pumps that require high flow rates, to maintain an acceptable low pressure drop through the check valve, the inlet port of the pump is correspondingly larger and the dimensions of the intake check valve member has to also be increased. While the valve member of the intake check valve is designed with a weight that ensures an appropriate sealing between the valve member and its seat when the valve is closed, using a heavier valve member can affect the valve's response time.

Check valves have to fulfill other design requirements as well, such as a good sealing between the valve member and its seat when the valve is closed and being strong enough to withstand the different pressures acting on it, especially when the fluid in the pump's working chamber is being pressurized. Another feature of such check valves relates to prevent the sticking of the valve member to the valve seat, for example, for valves which handle fluids with contaminants which can adhere to the valve member. Such problems have been solved in the past by having a valve member with a convex surface as described in U.S. Pat. Nos. 7,484,526 and 8,328,543. In these examples, the convex surface of the valve member is facing the seat of the valve member to allow a better sealing and, respectively, to prevent the sticking of the valve member to the valve seat.

While the solutions from the prior art mentioned above address some of the problems related to the operation of different check valves, there is still a need for a simple solution for improving the response time of check valves, in particular of larger valves used for example in high capacity pumps and especially those pumps that are pumping fluids that are at a temperature near their boiling point, because a high pressure drop with such fluids can result in vaporization and reduced performance.

SUMMARY

A check valve is disclosed for allowing fluid flow through a hydraulic passage in one direction and preventing fluid flow in the opposite direction. The check valve comprises a valve member which is movable between a seated and an open position to allow fluid flow in one direction from the inlet port to the outlet port. The valve member is disc shaped and comprises a central portion with a substantially convex curvature extending in the direction of fluid flow and a guide portion that surrounds the central portion and has a weight to area ratio that is smaller than the weight to area ratio of the central portion.

The central portion of the valve member comprises a flat peripheral portion that is in contact with a cooperatively shaped valve seat when the valve member is seated. In a preferred embodiment, the guide portion of the valve member comprises several orifices through which fluid can flow when the valve member is in its open position. These orifices are preferably shaped to increase the cross-sectional flow area through the valve and reduce pressure drop. For example, the orifices can have a kidney-shaped cross-sectional area. The kidney shape of the orifices is defined herein to mean that the orifices are shaped like an oval with an inward curve on one side and an outward curve on the opposing side.

In another preferred embodiment, the guide portion of the valve member cooperates with a guiding mechanism that is associated with the valve body. In one preferred embodiment, the guide portion of the valve member comprises a plurality of arms which are connected to the central portion of the valve member. Preferably the guiding mechanism is in the form of a shape that cooperates with each one of the plurality of arms, for example the guiding mechanism comprises a plurality of pins, each pin being aligned with an orifice associated with each one of the arms, whereby the pins guide the movement of the valve member when it moves between the seated and the open position.

In other embodiments, such a guiding mechanism can further comprise an elastic element, disposed between the valve member and the valve body, and associated with each of the pins to reduce the fluid forces needed to lift the valve member from the valve seat.

In another variant, the guiding mechanism comprises channels provided in the valve housing, the channels being cooperatively shaped with the arms of the valve member for guiding the arms when the valve member moves between its seated and its open position.

In preferred embodiments, the valve member has a composite structure with the central portion of the valve member being made from a heavier material and the guide portion being made from a lighter material. For example, the central portion of the valve member is made from metal and the guide portion of the valve member is made from a polymeric material. In other embodiments, the central portion comprises a core made of metal and this core is coated with a polymeric layer which extends beyond the central portion and forms the guide portion of the valve member.

In yet another embodiment of the present check valve the central portion further comprises a side that faces the inlet port of the valve and has a substantially convex shape with a central convex curvature extending towards the inlet port. In such embodiments, the central portion can further comprise a hollow volume between the opposing convex curvatures which further reduces the overall weight of the valve member.

A piston pump is disclosed which comprises an intake check valve of the construction described above. The piston pump comprises a piston which is moved within a pump cavity to increase the pressure of a fluid which enters the pump through an inlet port and which is delivered to a fluid system through an outlet port. The inlet port of the valve is in fluid communication with the inlet port of the pump.

In preferred embodiments, the intake check valve of the piston pump comprises a guide portion which has a plurality of orifices through which fluid can flow when the valve member is in an open position. The orifices of the guide portion of the valve member are shaped to increase the cross-sectional flow area through the valve and reduce pressure drop. Preferably, these orifices have a kidney-shaped cross-sectional area.

In some embodiments, the intake check valve of the piston pump comprises a valve member having a central portion that is made of metal. In these embodiments, the piston pump can comprise a mechanism for reducing the fluid forces needed to lift the valve member from the valve seat. This mechanism comprises a permanent magnet mounted in the piston of the pump whose magnetic field attracts the valve member to move it towards its open position.

BRIEF DESCRIPTION OF THE DRAWINGS

The drawings illustrate specific preferred embodiments of the invention, but should not be considered as restricting the spirit or scope of the invention in any way.

DETAILED DESCRIPTION OF THE PREFERRED EMBODIMENTS

The check valve illustrated in the preferred embodiments shown in FIGS. 1 to 8 is a valve that allows fluid flow through a hydraulic passage in one direction, between an inlet port and an outlet port, and prevents fluid flow in the opposite direction. An example of such a valve is the intake check valve installed in a hydraulic pump, for example in a reciprocating piston pump which supplies fuel such as LNG from a tank to an internal combustion engine fuelled with natural gas. The preferred embodiments illustrated here are described in relation to such an intake check valve, but they can be applied to any other check valves that work on the same principle of lifting a valve member to allow fluid flow in one direction and prevent fluid flow in the opposite direction.

Figure 1:
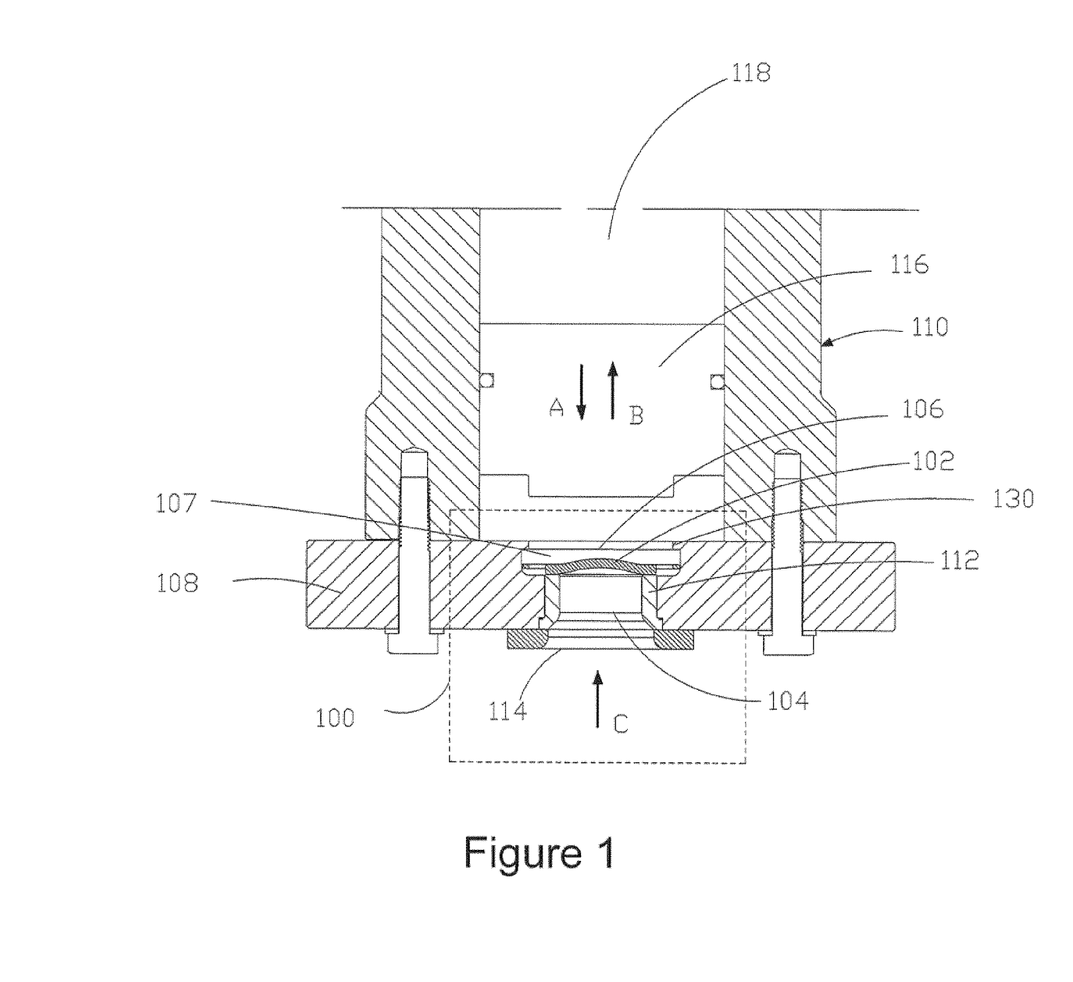
FIG. 1 shows a cross-sectional view that is a schematic illustration of a first preferred embodiment of the present check valve mounted in a reciprocating piston pump.

Such an intake check valve is schematically illustrated in FIG. 1 which shows a cross-sectional view of the check valve mounted in a hydraulic piston pump. Check valve 100 comprises valve member 102, inlet port 104 and outlet port 106. In the preferred embodiment shown here, the check valve is housed in flange 108 of hydraulic piston pump 110. In other embodiments (not shown), the valve can have its own separate housing that is mounted in the housing of the pump. Inlet port 104 receives fluid that is drawn through pump's inlet port 114. Pump 110 comprises piston 116 which moves within pump working chamber 118 in direction A to allow fluid flow into the pump working chamber, during the intake stroke, and in the opposite direction B, during the power stroke, to pressurize the fluid.

In its seated position illustrated in FIG. 1 valve member 102 rests on the surface of seat 112. During the pump's intake stroke, a pressure differential caused by reduced pressure in the working chamber causes the fluid forces acting on valve member 102 to lift it from seat 112 whereby fluid flows through pump inlet 114, as illustrated by arrow C, and then through valve inlet 104. In its fully open position valve member comes into contact with retainer portion 130 provided in this embodiment by a feature of flange 108. Retainer portion 130 can be in the form of any feature that prevents valve member 102 from travelling beyond well 107. For example, retainer portion 130 could be in the form of a plurality of washers attached to flange 108 and spaced around the outlet 106 with each washer having a portion that overhangs well 107.

Figure 2A:
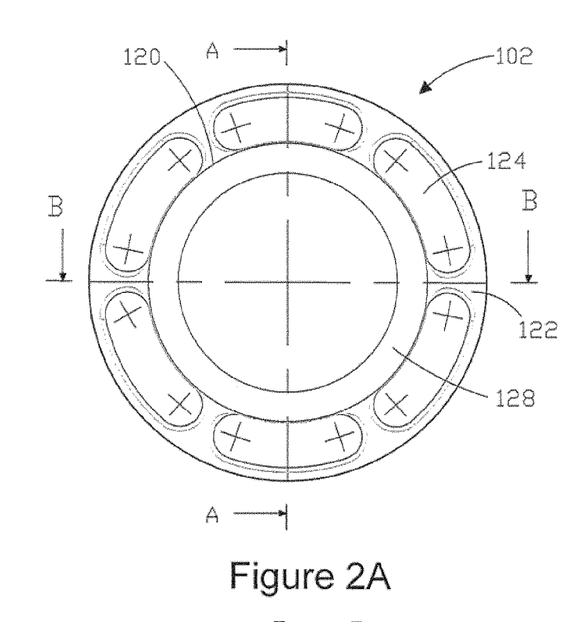
FIG. 2A is a top view of the valve member which is part of the first preferred embodiment of the present check valve comprising kidney-shaped orifices for allowing fluid flow between the inlet port and the outlet port when the valve member is lifted from its seated position.
Figure 2B:
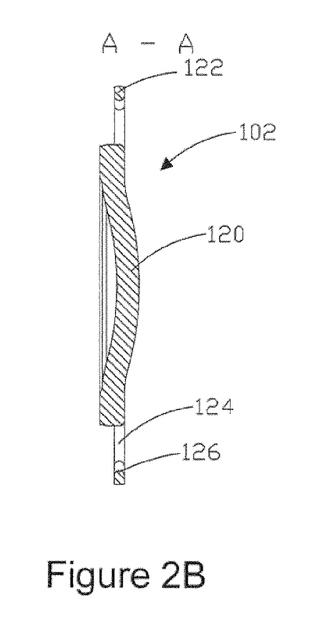
FIGS. 2B and 2C are respective cross-sectional views at section A-A and B-B shown in FIG. 2A.
Figure 2C:
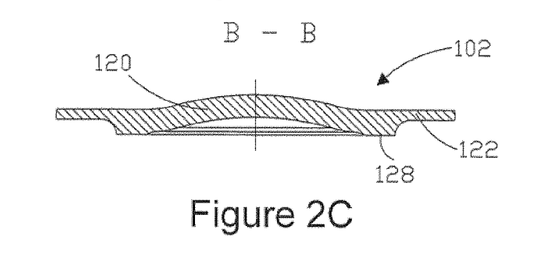

As illustrated in FIGS. 2A, 2B and 2C, valve member 102 comprises central portion 120 of a substantially domed convex shape and guide portion 122 which surrounds central portion 120. In cross-section, central portion 120 has a convex curvature and when valve member 102 is placed on its seat 112 the convex curvature of the central portion extends towards outlet port 106 of the valve and in the direction of the fluid flow, as illustrated in FIG. 1. Valve member 102 can further comprise a flat peripheral portion 128 that comes into contact with a cooperative sealing surface of seat 112 when the valve member is seated and ensures a better sealing between the valve member and the seat.

The valve response time depends on the weight of the valve member. The valve response time is defined here to mean the time required for the valve member to lift from its seated position once the valve member is subjected to a differential pressure that favors moving said valve member. For high capacity pumps, as the size of the check valve increases the size of the valve member can become too heavy affecting the valve's response time. Since it is preferred not to use any external controls to activate this type of valve into its open position, it is preferred to use solutions for reducing the overall weight of the valve member to improve the valve's response time, such that the valve opens at the right timing, and with reduced pressure drop.

For this purpose, the present check valve has a valve member that comprises a guide portion having a weight to area ratio that is smaller than the weight to area ratio of the central portion of the valve member. The central portion of the valve member is heavier than the guide portion. The central portion is made of a material that has the strength to resist deflection, fatigue and deformation this allows better sealing between the valve member and the valve seat in the valve's closed position, while the overall weight of the valve member is reduced.

Figure 3A:
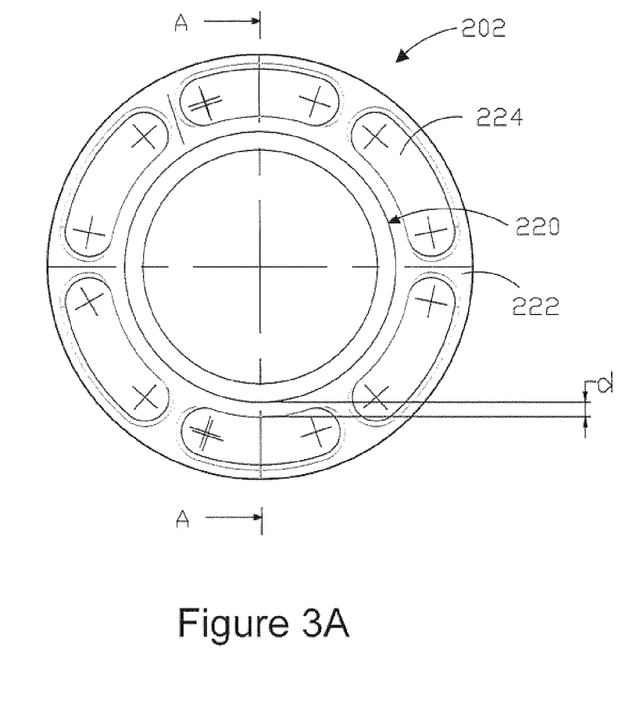
FIG. 3A is a top view of the valve member that is part of another preferred embodiment of the present check valve comprising kidney-shaped orifices placed in the guide portion of the valve member at a certain distance from the central portion and FIG. 3B is a cross-sectional view at section A-A shown in FIG. 3A.
Figure 3B:
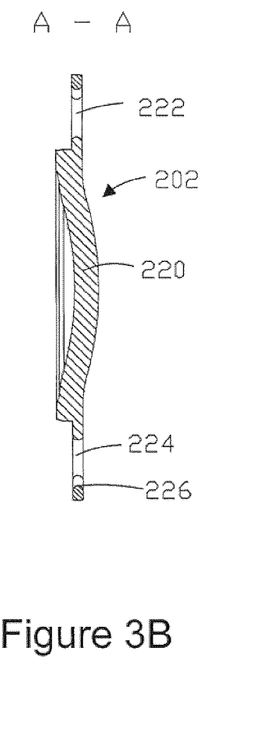

The weight to area ratio of guide portion 122 can be reduced because it does not require the same strength as the central portion. Guide portion 122 can be provided with orifices 124 which lightens valve member 102 by reducing the amount of material, while also providing more flow area to reduce pressure drop when fluid flows from inlet 104 to outlet 106. Orifices 124 can be shaped to increase the cross-sectional flow area through this part of the valve. As illustrated in FIG. 2A, such orifices are preferably kidney-shaped. The orifices illustrated in FIG. 2A are spread around the peripheral area of the valve member in the guide portion that surrounds central portion 120, directly adjacent to the sealing surface of peripheral portion 128, or they can be spread around the peripheral area of valve member at a certain distance "d" spaced from the sealing surface, as illustrated in FIGS. 3A and 3B. In this embodiment, valve member 202 comprises a convex shaped central portion 220 and guide portion 222 provided with orifices 224 distributed around the peripheral area of the valve member. In both variants, edges 126 and 226 of orifices 124 and respectively 224 can be curved, as shown, to allow a better flow of the fluid therethrough.

Other embodiments of the present check valve are further described below. These embodiments have many components that are equivalent to like components of the embodiment presented in FIGS. 1, 2A, 2B, 2C, 3A and 3B and like components are identified by like reference numbers. In this disclosure like-numbered components function in substantially the same way in each embodiment. Accordingly, if like components have already been described with respect to one embodiment, while identified in the figures for other embodiments, the purpose and function of like components may not be repeated for each of the illustrated embodiments.

Figure 4A:
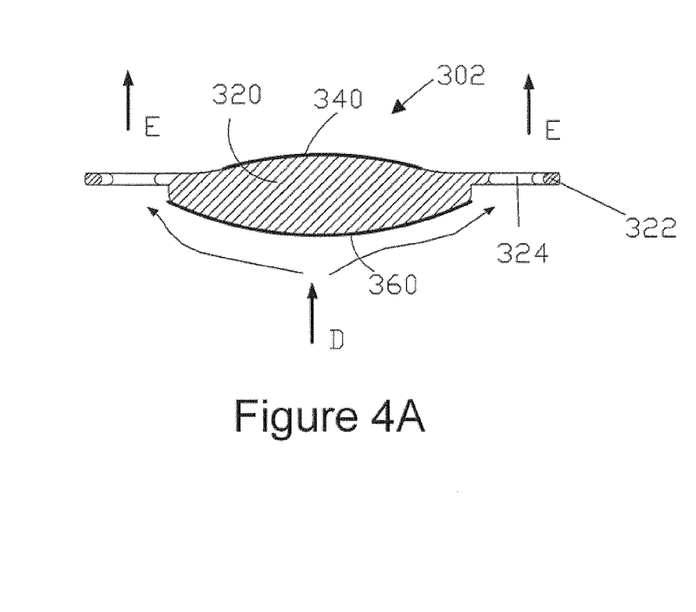
FIGS. 4A and 4B are cross-sectional views of two variants of another embodiment of the present check valve comprising a central portion which has two convex sides.
Figure 4B:
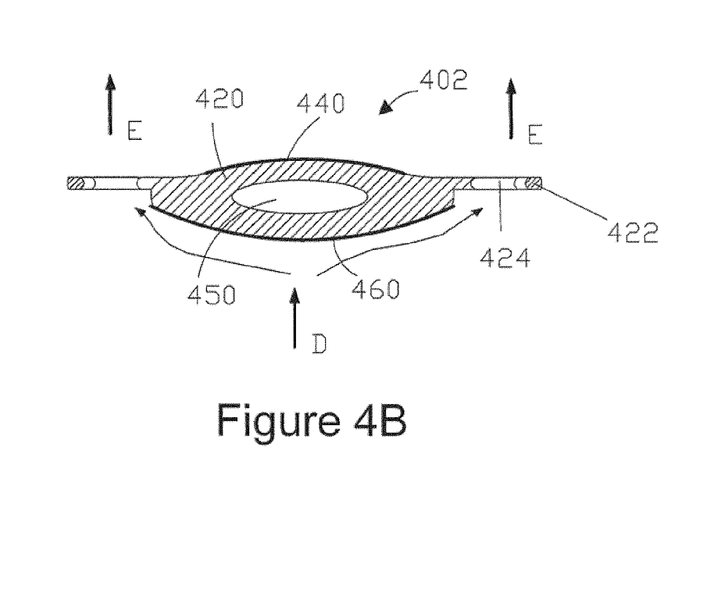

Another embodiment of the present check valve is shown in FIGS. 4A and 4B which illustrate valve member 302 having central portion 320 of a substantially convex shape having a convex curvature 340 on one side as described in the previous examples and a second convex curvature 360 on the opposite side. Curvature 360 extends towards the inlet port and guides the flow of fluid stream D coming from the inlet sideways and further through orifices 324 in direction E towards the outlet port.

FIG. 4B illustrates a variant of the embodiment shown in FIG. 4A, this variant having a valve member 402 whose central portion 420 comprises a hollow volume 450 for reducing the overall weight of the central portion of the valve member.

Figure 5:
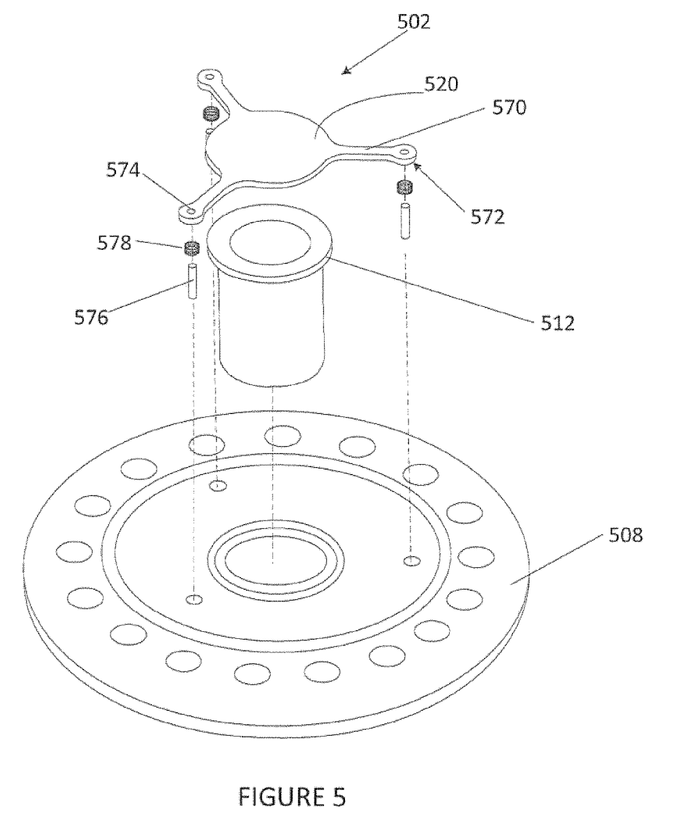
FIG. 5 shows an exploded perspective view of another embodiment of the present check valve comprising a guide portion formed by several arms which extend from the central portion.
Figure 6:
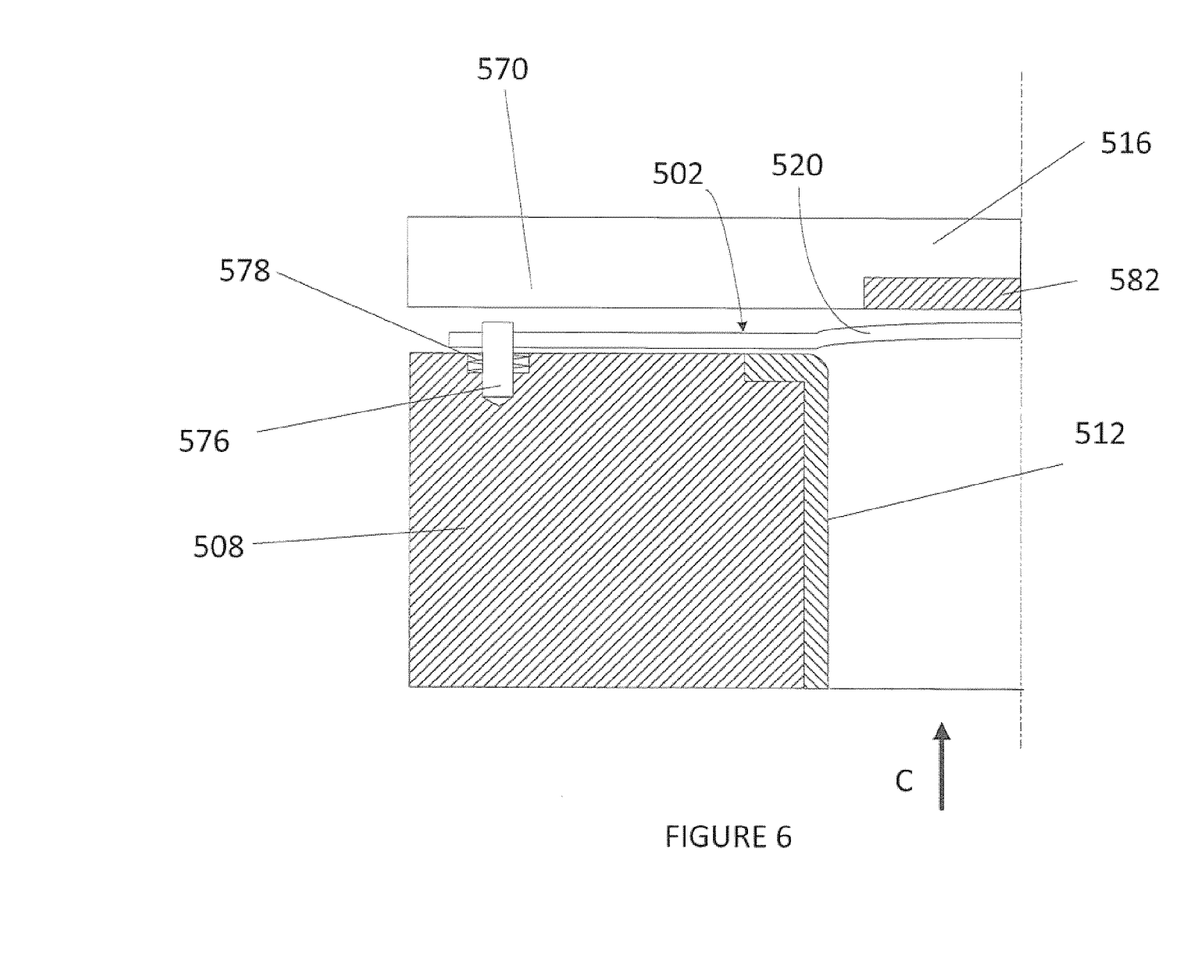
FIG. 6 shows a cross-sectional view that is a schematic illustration of an embodiment of a mechanism for guiding and helping the movement of the valve member between its seated and its open position.

FIG. 5 shows an exploded perspective view of another embodiment of the present check valve with a different configuration of the guide portion of the valve member. Valve member 502 comprises central portion 520 and a guide portion which comprises a plurality of arms 570 which are connected to central portion 520. A cross-sectional partial view of this embodiment is illustrated in FIG. 6. Central portion 520 is of a substantially convex shape having a convex curvature extending towards the outlet port as explained in relation to other embodiments described previously. In its seated position central portion 520 of valve member 502 rests on seat 512. When fluid flows into the pump cavity in direction C valve member 502 is lifted from its seated position allowing fluid to flow through the space between arms 570 towards the valve outlet. In some embodiments, valve member 502 is guided in its movement between a seated position and an open position by a guiding mechanism that is positioned within the valve housing or within the housing of the pump, as further described below.

Referring again to FIG. 5, in some preferred embodiments, arms 570, each have a preferably rounded end 572 which comprises an orifice 574. The guiding mechanism comprises a series of pins 576 fixedly attached to the pump housing or to the valve housing, each pin protruding through the orifice of a corresponding arm 570 of the valve member when the valve member is seated as illustrated in FIG. 6. The present check valve can have other constructional variants comprising more than three arms. In the embodiments comprising a guiding mechanism, the movement of valve member 502 between a seated position and an open position is guided by pins 576 whereby arms 570 of the valve member slide along the length of corresponding pins 576. FIGS. 5 and 6 show an embodiment that comprises three such arms wherein each arm is guided by a pin fixed into the pump housing.

In preferred embodiments the check valve can also be provided with elastic elements 578 which are each interposed between each arm 570 and the valve housing, or as illustrated in FIG. 6 between each arm 570 and flange 508 of the piston pump where the valve is mounted. Elastic elements 578 help the movement of the valve member between from its seated position to its open position. Elastic elements 578 are illustrated as springs, but other equivalent elements which generate an elastic force pushing the valve member away from the housing can be used for this purpose. Elastic elements 578 are not strong enough to lift the valve member without the requisite differential pressure, but they do help to reduce the response time. Other devices can be used with the disclosed valve for helping reduce response time, for example a permanent magnet 582 can be mounted in piston 516 of the pump, as illustrated in FIG. 6 and the central portion of the valve member can be made from a material so that the magnetic field of the permanent magnet will attract the valve member and assist with moving it towards its open position with reduced response time.

Figure 7:
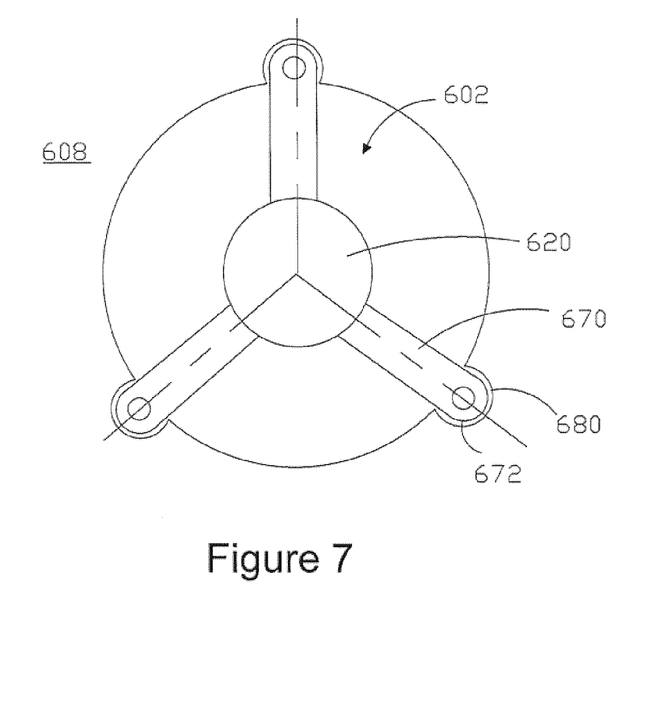
FIG. 7 shows a top view of a valve member comprising a guide portion formed of several arms which are guided in channels provided in the valve housing.
Figure 8:
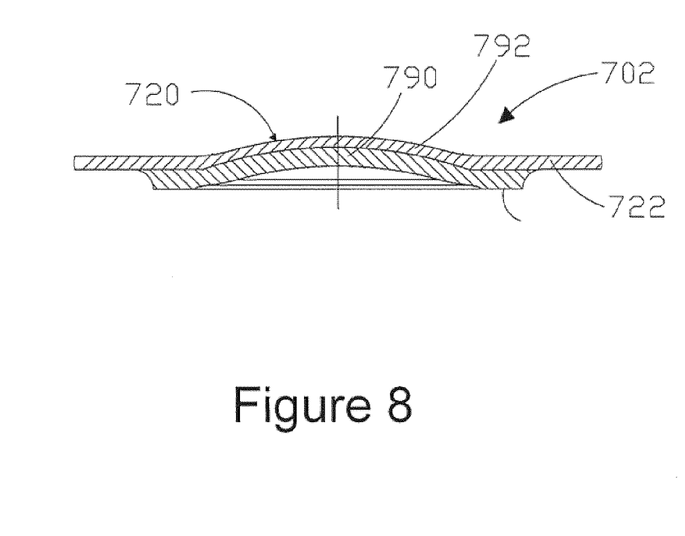
FIG. 8 is a cross-sectional view of another embodiment of the present check valve wherein the central portion of the valve member is coated by a polymeric layer which also forms the guide portion of the valve member.

Another mechanism for guiding the movement of the valve member between its seated and its open position is illustrated in FIG. 7. In this embodiment, valve member 602 comprises central portion 620 and a guide portion comprising arms 670 which extend from the central portion as described in relation to the embodiment illustrated in FIGS. 5 and 6. In the embodiment of FIG. 7, housing 608 which can be the valve housing or the housing of the device where the check valve is mounted, for example the housing of a piston pump, comprises longitudinal channels 680 in which ends 672 of arms 670 which are part of the guide portion of the valve member can slide when the valve member is moved between its seated and its open position.

In all embodiments described above, the valve member of the check valve is shown and described as being made of one material, for example metal. In other embodiments the valve member can be a composite element comprising a central portion made of a heavier material, for example metal and the guide portion can be made of a lighter material, for example a polymer. Having the central portion of the valve member made of a heavier material allows a better sealing of the valve member to the valve seat when the valve member is seated while the lighter material of the guide portion reduces the overall weight of the valve member to allow a faster response time of the valve. In yet another embodiment illustrated in FIG. 8 central portion 720 of valve member 702 comprises a core 790 made preferably of a heavier material, for example metal, which is coated by layer 792 made of a lighter material, for example made of a polymeric material, the coating layer forming guide portion 722 of the valve member.

The advantage of the present check valve compared to the known check valves is that the constructional features of the valve member allow a faster response time of the valve because of the overall reduced weight of the valve member. Another advantage of the shown embodiments is that by having a convex shaped central portion of the valve member with a curvature that extends towards the valve outlet port the durability of the valve is improved. In check valves having a flat valve member the pressure of the fluid which tries to close the valve can sometimes be high enough such the valve member flexes towards the valve inlet generating the wear of the valve member at the contact point with the housing. In the present check valve when fluid pushes against the valve member trying to flow from the valve outlet to its inlet, for example during the power stroke of the piston pump, the valve member flexes towards a flat position and therefore the wear at the contact points between the valve member and the housing is reduced. In some embodiments, a slight lateral movement of the valve member within the housing is also permitted which favors a flat position of the valve member in response to the pressure from the fluid pushing against the valve member towards the valve inlet port.

To better illustrate the claimed features of the check valve, in the drawings, some of the details related to known elements that constitute said valves have been simplified. Actual working arrangements of the check valve include more details of the valve housing and of all the other parts of the check valve as well as other details related to the device where the check valve is positioned.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

I claim:

1. A check valve comprising:
   a valve housing including a well defined in the valve housing, a retainer associated with the valve housing and a valve seat; and
   a valve member which is movable between a closed seated position and an open position to allow fluid flow in one direction from an inlet port to an outlet port, wherein said valve member is disc shaped and comprises:
   i. a central portion which maintains a substantially continuous convex curvature occupying substantially all the central portion and extending towards the outlet port extending in the direction of fluid flow when in either the closed seated position or the open position,
   ii. a flat peripheral portion around the substantially continuous convex curvature of the central portion, the flat peripheral portion in contact with a cooperative sealing surface of the valve seat when said valve member is in the closed seated position, and
   iii. a guide portion that surrounds said central portion and said flat peripheral portion, said guide portion being thinner than said central portion and said flat peripheral portion and having a weight to area ratio that is smaller than the weight to area ratio of said central portion; and
   wherein said guide portion travels within said well defined in said valve housing between the valve seat when in the seated position and said retainer when in a fully open position.

2. The check valve of claim 1 wherein said central portion comprises a material which resists deflection, fatigue and deformation.

3. The check valve of claim 1 wherein said guide portion defines several orifices therein through which said fluid can flow when said valve member is in said open position.

4. The check valve of claim 3 wherein said orifices are shaped to increase the cross-sectional flow area through said valve and reduce pressure drop.

5. The check valve of claim 4 wherein said orifices have a kidney-shaped cross-sectional area.

6. The check valve of claim 1 wherein said guide portion comprises a plurality of arms which are connected to said central portion.

7. The check valve of claim 6 further comprising a guiding mechanism having a shape that cooperates with one of said plurality of arms.

8. The check valve of claim 7 wherein said guiding mechanism is a pin, the pin being aligned with an orifice associated with the one of said plurality of arms whereby said pin guides movement of the valve member when it moves between said seated and said open position.

9. The check valve of claim 8 further comprising an elastic element disposed between said valve member and said valve housing and associated with said pin.

10. The check valve of claim 7 wherein said guiding mechanism comprises a channel provided in said valve housing, said channel receiving said one of said plurality of arms and guiding said one of said plurality of arms when said valve member moves between said seated and said open position.

11. The check valve of claim 1 wherein said valve member has a composite structure, said central portion made from a material heavier than a material from which said guide portion is made.

12. The check valve of claim 1 wherein said central portion of said valve member is made from metal and said guide portion is made from a polymeric material.

13. The check valve of claim 1 wherein said central portion comprises a core made of metal, said core being coated with a polymeric layer which extends beyond said central portion and forms said guide portion.

14. The check valve of claim 1 wherein said central portion further comprises a side that faces an inlet port which has a substantially convex shape with a central convex curvature extending towards said inlet port.

15. The check valve of claim 14 wherein said central portion comprises a hollow volume between said opposing convex curvatures.

16. The check valve of claim 1, wherein the valve member is free-floating.

17. A piston pump comprising a piston which is moved within a pump cavity to increase the pressure of a fluid which enters the pump through an inlet port and which is delivered to a fluid system through an outlet port, the piston pump further comprising the check valve of claim 1 whose inlet port is in fluid communication with said inlet port of said pump.

18. The piston pump of claim 17 wherein said guide portion of said valve member comprises a plurality of orifices through which said fluid can flow when said valve member is in said open position.

19. The piston pump of claim 18 wherein said orifices of said guide portion of said valve member are shaped to increase the cross-sectional flow area through said valve and reduce pressure drop.

20. The piston pump of claim 19 wherein said orifices have a kidney-shaped cross-sectional flow area.

21. The piston pump of claim 17 wherein said central portion of said valve member is made of metal and wherein said piston pump further comprises a mechanism for reducing the fluid forces needed to lift said valve member from said valve seat, said mechanism comprising a permanent magnet mounted in said piston of said pump.

22. A check valve comprising:
   a valve housing including a well defined in the valve housing, a retainer associated with the valve housing and a valve seat; and
   a valve member which is movable between a closed seated position and an open position to allow fluid flow in one direction from an inlet port to an outlet port, wherein said valve member is disc shaped having an outer circumferential edge and comprises;
      i. a central portion which maintains a substantially continuous convex curvature extending towards the outlet port in the direction of fluid flow when in either the closed seated position or the open position,
      ii. a flat peripheral portion around the substantially continuous convex curvature of the central portion, the flat peripheral portion substantially perpendicular to the direction of fluid flow and in contact with a cooperative sealing surface of the valve seat when said valve member is in the closed seated position, and
      iii. a guide portion that surrounds said central portion and said flat peripheral portion and is defined in part by said outer circumferential edge, said guide portion being thinner than said central portion and said flat peripheral portion and having a weight to area ratio that is smaller than the weight to area ratio of said central portion; and
   wherein said outer circumferential edge of said valve member travels within said well defined in said valve housing between the valve seat when said valve member is in the seated position and said retainer when in a fully open position.

\* \* \* \* \*